Patented Jan. 9, 1934

1,942,791

UNITED STATES PATENT OFFICE 1,942,791

ELECTRODE FOR SECONDARY CELLS

Karl Ackermann, Mannheim, Germany, assignor to I. G. Farbenindustrie Aktiengesellschaft, Frankfort-on-the-Main, Germany No Drawing. Application February 18, 1930, Serial No. 429,462, and in Germany February 20, 1929

4 Claims. (Cl. 136—25)

The present invention relates to improvements in and to the production of electrodes for secondary cells, in particular those having alkaline electrolytes. Electrodes for secondary cells, in particular those having alkaline electrolytes have already been proposed, which are obtained by introducing active masses into the pores of a coherent, porous material conducting like a metal, as for example iron or ferroso-ferric oxide. Further investigations on the subject have revealed the fact that when employing porous iron plates or ferroso-ferric oxide plates with or without the addition of nickel, which plates are filled, when employed as positive electrodes, for example with nickel hydroxide, or when employed as negative electrodes, with iron sponge, a gradual decrease in the capacity and in the strength of the plates sometimes takes place. This is apparently due to the fact that the framework of the plates does not always behave quite indifferently to the electro-chemical processes.

I have now found that porous electrode bodies prepared from iron or ferroso-ferric oxide or mixtures of these substances with or without tions of nickel, which electrode bodies are hereinafter comprised by the term "ferrous electrode bodies", become almost entirely incapable of being attacked and in some cases even acquire a better conductivity when the walls of the pores of the electrode bodies are coated with a thin layer of a metal electrochemically resistant in the alkaline electrolyte used in storage batteries, as for example nickel or cobalt or alloys of these metals with copper or chromium, before the introduction of the active mass into the pores. This film of metal may for example be produced by impregnating the plates with a solution of a compound of the metal concerned for example with a solution of a nickel salt, drying and subjecting the plates to a heat treatment in a reducing atmosphere, whereby by igniting at elevated temperatures the metal, for example nickel, alloys with the iron to form a very stable coating on the walls of the pores. Before the reduction the salt may be converted into the hydroxide or oxide of the metal concerned by treatment with bases.

Porous ferroso-ferric oxide plates with or without additions treated in this manner are very suitable for the preparation of positive electrodes for accumulators having alkaline electrolytes. The production of the film of metal in these plates must be carried out in such a reducing atmosphere that no reduction or no appreciable reduction of the ferroso-ferric oxide takes place, and this may be effected for example by employing suitable mixtures of carbon monoxide and carbon dioxide or of hydrogen and water vapor. The composition of such gas mixtures depends on the temperature to be used in the reduction and can be calculated from the well-known equilibria of the systems in question.

The walls of the pores may also be coated electrolytically with a metallic film. For this purpose care should be taken that the electrolytic separation of the metal takes place as far as possible in the pores of the electrode body, and this may be effected by maintaining in the electrolyte present in the pores a sufficiently high content in metal or by providing for a sufficiently high temperature of the electrolyte within the electrode body.

For example, the electrode body may first be impregnated in a solution containing as much nickel salt as possible, so that the pores are filled with the solution, whereupon electrolysis is carried out with a high current density at ordinary or elevated temperature in an electrolyzing bath, in which the nickel salt is replaced at least in part, but preferably wholly by salts which give rise to a high conductivity of the solution, but from which no metal is deposited during the electrolysis, as for example alkali metal salts. In this way the nickel is deposited in the pores of the electrode body. Having regard to the chemical action of the nickel salts on the iron electrode body, it is preferable first to coat the electrode body with copper. This may be effected electrolytically in the same manner as the coating with nickel; or the coating with copper may be effected by direct contact by sucking the copper salt solution through the porous electrode body.

Iron plates thus coated with nickel are very suitable as supports for the positive mass of storage batteries with alkaline electrolytes. The impregnation with nickel hydroxide is effected preferably with the aid of a nickel sulphate solution, at least when carrying out the impregnation for the first time.

The following examples will further illustrate the nature of this invention, but the invention is not restricted to these examples.

*Example 1*

The walls of the pores of an iron sinter plate are coated with a thin layer of an iron nickel alloy by impregnating the plate with nickel nitrate solution and then igniting in a stream of hydrogen at 1100° C. The plate thus treated when used as the negative electrode in caustic alkali solution before the introduction of the active mass, possesses a capacity which is only 0.6 per cent of the value possessed by a similar plate which has not been provided with a film of metal. No increase in the capacity can be produced by repeated charging and discharging; consequently it appears that the iron plate has been rendered practically incapable of attack by the provision of the film of the alloy.

By introducing an active iron mass into the pores of the plate provided with the film of metal, by electrolytic decomposition of a solution of ferrous chloride, the plate as a negative electrode acquires a capacity which corresponds to the value to be expected in view of the amount of iron introduced.

By introducing cadmium hydroxide into the pores of such an iron plate, stable cathodes are obtained which do not gas in a charged state.

Example 2

A plate prepared from ferroso-ferric oxide with an addition of metallic nickel is impregnated with a solution of nickel nitrate and is ignited at about 800° C. in a gas stream consisting of 5 per cent of carbon monoxide and 95 per cent of carbon dioxide. The plate thus provided with a film of nickel is impregnated with nickel hydroxide and is used as a positive electrode. After having been discharged 80 times it still possesses its full capacity, while the capacity of a similar plate without a film of nickel after having been discharged 60 times has fallen to ⅔ of its original value. The plate which has been provided with a film of nickel gives in conjunction with a negative electrode, a higher average discharge voltage and works with a better efficiency than a plate without a film of nickel.

Example 3

A porous iron sinter plate is treated with a nickel salt solution as rich in nickel as possible, whereby the pores of the plate are filled with the solution. The plate is then cathodically polarized at 50° C. in a bath consisting merely of an acidified sodium sulphate solution, until the bulk of the nickel of the solution present in the pores is precipitated in the form of metal. Thereupon the outer surface of the plate is electrolytically coated with nickel in the usual manner in a nickel salt solution. The plate is next impregnated with nickel hydroxide, first with the aid of nickel sulphate and then with nickel nitrate. When the plate is used as anode in an accumulator with an alkaline electrolyte, it has a capacity nearly corresponding to that to be expected from the amount of the charge of nickel hydroxide. After 100 discharges the capacity of the plate is nearly unaltered, while a similar anode from an iron sinter plate which has not been coated with nickel has lost a considerable percentage of its original capacity already after a substantially smaller number of discharges.

What I claim is:

1. As new articles of manufacture, electrodes for storage batteries comprising a porous, ferrous electrode body, in which the walls of the pores are provided with a coating of a metal selected from the group consisting of nickel and cobalt, and in which the pores are provided with an active mass.

2. As new articles of manufacture, electrodes for storage batteries comprising a porous, ferrous electrode body, in which the walls of the pores are provided with a coating of nickel, and in which the pores are provided with an active mass.

3. As new articles of manufacture, electrodes for storage batteries comprising a porous iron electrode body, in which the walls of the pores are provided with a coating of nickel, and in which the pores are provided with an active mass.

4. An electrode for storage batteries comprising a porous, ferrous electrode body, in which the walls of the pores are provided with a coating of a metallic substance selected from the group consisting of nickel, cobalt and the alloys of one of these metals with one of the metals copper and chromium, and in which the pores are provided with an active mass.

KARL ACKERMANN.